United States Patent Office 3,646,063
Patented Feb. 29, 1972

3,646,063
PROCESS FOR A-NOR Δ³⁽⁵⁾,⁹,¹¹-ESTRATRIENE-
17β-OR-2-ONES
Robert Bucourt and Lucien Nedelec, Clichy-sous-Bois,
and Jean-Claude Gasc, Bondy, France, assignors to
Roussel-UCLAF, Paris, France
No Drawing. Filed May 29, 1968, Ser. No. 732,881
Claims priority, application France, May 29, 1967,
108,253; Aug. 23, 1967, 118,793
Int. Cl. C07d 13/04
U.S. Cl. 260—340.9
7 Claims

ABSTRACT OF THE DISCLOSURE

A process for the preparation of A-nor steroids of the formula

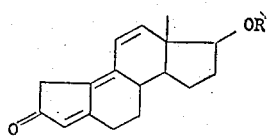

(I)

wherein R is selected from the group consisting of hydrogen, an acyl radical of an organic carboxylic acid of 1 to 18 carbon atoms and certain alkyl compounds and to novel intermediates produced therein and novel products produced thereby which have anabolic and androgenic activity.

PRIOR ART

Copending, commonly assigned United States patent application Ser. No. 658,036, filed Aug. 3, 1967, now Pat. No. 3,538,148, describes a process for the preparation of A-nor-Δ³⁽⁵⁾,⁹,¹¹-estratriene-17β-ol-2-one and esters and ethers thereof which compounds possess a considerable anabolic activity. The said process consists of converting 2-chloro-17β-acyloxy-3,5-seco - A - nor-Δ²,⁹-estradiene-5-one into an enol ester, brominating and dehydrobrominating the latter to introduce the Δ¹¹-double bond, hydrolyzing the latter to form 17β-acyloxy-3,5-seco-A-nor-Δ⁹,¹¹-estradiene-2,5-dione which is then cyclized to the desired product. The said process, however, has the disadvantage of being laborious due to the bromination and dehydrobromination and of not giving completely satisfactory results in the cyclization step yielding the A-nor product.

OBJECTS OF THE INVENTION

It is an object of the invention to provide a novel process for the production of A-nor-Δ³⁽⁵⁾,⁹,¹¹-estratriene-17β-ol-2-one without starting from the Δ⁹,¹¹-diene and with good yields in the cyclization step.

It is another object of the invention to provide novel intermediates for the A-nor-steroids of Formula I.

It is also an object of the invention to provide a novel ether of A-nor-Δ³⁽⁵⁾,⁹,¹¹-estratriene-17β-ol-2-one.

It is an additional object of the invention to provide novel anabolic compositions.

It is a further object of the invention to provide a method of inducing anabolic activity in warm-blooded animals.

These and other objects and advantages of the invention will become obvious from the following detailed description.

THE INVENTION

The process of the invention for the preparation of A-nor-steroids of the formula

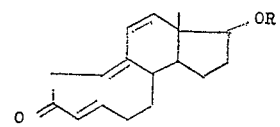

(I)

wherein R is selected from the group consisting of hydrogen, acyl of an organic carboxylic acid of 1 to 18 carbon atoms and ether residue, comprises condensing an enamine of the formula

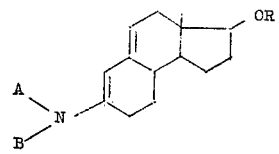

(II)

wherein R has the above definition, A is selected from the group consisting of lower alkyl, lower alkenyl and aralkyl, B is lower alkyl and A and B taken together may be selected from the group consisting of lower alkylene and ethyleneoxyethylene with a lower alkyl γ-halo-β-alkoxycrotonate to form a compound of the formula

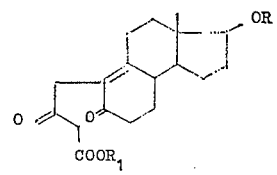

(III)

wherein $R_1$ is lower alkyl, cyclizing the latter with an alkaline agent to form a compound of the formula

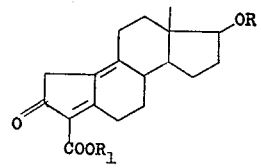

(IV)

wherein R and $R_1$ have the above definition, subjecting the latter to acid hydrolysis to form a compound of the formula

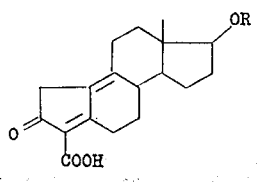

(V)

decarboxylating the latter to form a compound of the formula

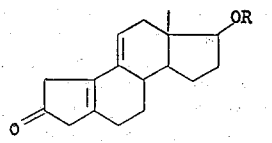

(VI)

and treating the latter with a substituted p-benzoquinone to form the desired A-nor-Δ³⁽⁵⁾,⁹,¹¹-estratriene-2-one. The term "lower" is intended to indicate 1 to 7 carbon atoms.

The acids used to form the 17-esters have 1 to 18 carbon atoms and may be aliphatic, saturated or unsaturated cycloaliphatic, aromatic or heterocyclic. Examples of suitable acids are formic acid, acetic acid, propionic acid, butyric acid, isobutyric acid, valeric acid, isovaleric acid, trimethylacetic acid, caproic acid, β-trimethylpropionic oenanthic acid, caprylic acid, pelargonic acid, capric acid, undecylic acid, undecylenic acid, lauric acid, myristic acid, palmitic acid, stearic acid, oleic acid, maleic acid, fumaric acid, malic acid, malonic acid, succinic acid, tartaric acid, cyclopentyl, cyclopropyl, cyclobutyl and cyclohexylcarboxylic acid, from cyclopropylmethylcarboxlic acid, cyclobutylmethylcarboxylic acid, cyclopentylethylcarboxylic acid, cyclohexylethylcarboxylic acid, from cyclopentyl-, cyclohexyl- or phenylacetic acid or propionic acid, from benzoic acid, from phenoxyalkanoic acids such as phenoxyacetic acid, p-chlorophenoxyacetic acid, 2,4 - dichlorophenoxyacetic acid, 4-t.-butylphenoxyacetic acid, 3-phenoxypropionic acid, 4-phenoxybutyric acid, from furan-2-carboxylic acid, 5-t.-butylfuran-2-carboxylic acid, 5-bromo-furan-2-carboxylic acid, from nicotinic acid, from β-ketocarboxylic acids, for example, acetylacetic acid, propionylacetic acid, butyrylacetic acid, from aminoacids such as diethylaminoacetic acid, aspartic acid.

Examples of suitable ether residues in the 17-position are tetrahydropyranyl, alkoxymethylene and alkylthiomethylene of 2 to 10 carbon atoms, lower alkenyl and aralkoxymethylene and aralkylthiomethylene of 7 to 10 carbon atoms.

A variation of the process of the invention to obtain an A-nor - 17-alkenyloxy-$\Delta^{3(5),9,11}$-estratriene-2-one comprises protecting the 2-keto group in the form of a ketal such as ethylenedioxy of a compound of Formula VI in which R is hydrogen or acyl of an organic carboxylic acid of 1 to 18 carbon atoms and reacting the latter with an alkenyl halide after saponification when R is acyl and then reacting the resulting product, after an acid hydrolysis with a substituted p-benzoquinone to introduce the $\Delta^{3(5),9,11}$-system of double bonds.

The starting enamines of Formula II may be made by the process of French Pat. No. 1,271,997. Examples of suitable starting materials are:

5-pyrrolidyl-17β-benzoyloxy-des-A-$\Delta^{5(10),9(11)}$-estradiene,
5-pyrrolidyl-17β-acetoxy-des-A-$\Delta^{5(10),9(11)}$-estradiene,
5-pyrrolidyl-17β-phenylacetoxy-des-A-$\Delta^{5(10),9(11)}$-estradiene,
5-piperidinyl-17β-acetoxy-des-A-$\Delta^{5(10),9(11)}$-estradiene,
5-morpholinyl-17β-acetoxy-des-A-$\Delta^{5(10),9(11)}$-estradiene, etc.

Examples of lower alkyl γ-halo-β-alkoxycrotonate for condensation with the enamine of Formula II are ethyl or propyl γ - bromo - β - ethoxycrotonate, ethyl-γ-bromo β-methoxy crotonate, ethyl-γ-bromo-β-propyloxy crotonate, ethyl-γ-bromo-β-isopropyloxy crotonate, etc. The said condensation is effected in the presence of an alkali metal iodide such as potassium iodide in an aprotic solvent such as di-loweralkyl formamide such as dimethylformamide or hexamethyl phosphotriamide with slight cooling.

Examples of suitable alkaline agents to effect the cyclization of the compound of Formula III are alkali metal alcoholate such as potassium t.-butylate or alkali metal hydrides or amides and the reaction is preferably effected in an organic solvent such as tetrahydrofuran, ethyl ether, benzene, toluene, etc., at or about room temperatures.

The acid hydrolysis of the compound of Formula IV is preferably effected with a strong mineral acid such as sulfuric acid or hydrochloric acid in an aqueous-organic solvent such as a water-dioxane mixture.

The said hydrolysis of the 3-acyloxy group will usually effect a partial or total hydrolysis of any 17-acyloxy group. The said products can then be separated or the mixture may be decarboxylated and the said product esterified to obtain a single ester.

The decarboxylation of the compound of Formula V with the simultaneous shifting of the double bonds can be simply effected by heating, preferably in a high boiling point organic solvent such as quinoline. To accelerate the decarboxylation step, a catalyst such as copper chromite may be added.

The system of three double bonds 3(5), 9(10), 11(12) is introduced by means of a benzoquinone such as 2,3-dichloro-5,6-dicyano-p-benzoquinone,
2,3-dibromo-5,6-dicyano-p-benzoquinone,
2,3,5,6-tetrachloro-p-benzoquinone,
2,3-dicyano-5-chloro-p-benzoquinone,
2,3-dicyano-p-benzoquinone,
etc.

The reaction is effected in an organic solvent such as benzene, toluene, dioxane, ethyl acetate or propyl acetate and is carried out at a moderate temperature, preferably at room temperature.

The novel product of the invention, 17β-methallyloxy-A-nor-$\Delta^{3(5),9,11}$ - estratriene - 2-one, has interesting pharmacological properties, namely, a strong anabolic and androgenic activity. It can be used for the treatment of disturbances of protein anabolism, asthenia, emaciations, osteoporosis, andropause, senescence, delays in the mending of fractures, metabolic disturbances of prolonged corticotherapies, adiposo-genital syndrome, functional menometrorrhagias, fibromas, endometritis, as supplementary treatment of cancer of the breast and as scarring agent in the treatment of varicose ulcers.

The novel anabolic and androgenic compositions of the invention are comprised of an effective amount of 17β-methallyloxy-A-nor - $\Delta^{3(5),9,11}$ - estratriene-2-one and a major amount of a pharmaceutical carrier. The compositions may be in the form of drinkable or injectable solutions or suspensions, tablets, coated tablets, sublingual tablets, suppositories, capsules, ointments, creams and topical pulverized powders, prepared in the usual manner.

The method of the invention for inducing anabolic activity in warm-blooded animals comprises administering to warm-blooded animals an effective amount of 17β-methallyloxy-A-nor-$\Delta^{3(5),9,11}$-estratriene-2 - one. The said product may be administered orally, perlingually, parentally, rectally or topically on the skin and mucous membranes, but preferably orally. The usual useful daily dosage is 0.008 to 0.3 mg./kg. depending upon the method of administration.

In the following examples there are described several preferred embodiments to illustrate the invention. However, it should be understood that the invention is not intended to be limited to the specific embodiments.

EXAMPLE I.—PREPARATION OF A-NOR-$\Delta^{3(5),9,11}$-ESTRATRIENE-17β-OL-2-ONE

Step A: Preparation of 3-ethoxycarbonyl-3,5-seco-17β-benzoyloxy-A-nor-$\Delta^9$-estraene-2,5-dione 215 cc. of dimethylformamide were added to 647 cc. of a solution of 15.5 gm. per liter of potassium iodide in dimethylformamide and then 214 gm. of 5-pyrrolidyl-17β-benzoyloxy-des-A - $\Delta^{5(10),9(11)}$ - estradiene (described in French Pat. No. 1,271,997) were slowly added thereto under nitrogen. The resulting suspension was cooled to about 2° C. and then 124 cc. of ethyl γ-bromo-β-ethoxycrotonate (Beilstein III, 2nd supplement p. 255) were added thereto over 15 minutes. The mixture was maintained at this temperature for 2 hours, after which 215 cc. of water were added and the solution was heated at 90° C. to 100° C. for one hour. After cooling, 215 cc. of acetic acid were added and the mixture was agitated for 30 minutes at ambient temperature. The mixture was poured into water and was extracted with an isopropyl ether/ethyl ether mixture (1:1). The extracts were washed with water, dried and evaporated to dryness in vacuo. The residue was recrystallized from isopropyl ether to obtain 121 gm. (47.5% yield) of 3-ethoxycarbonyl-3,5-seco-17β - benzoyloxy-A-nor-$\Delta^9$-estraene-2,5-dione having a melting point of 80° C., and which was used as is for the next step.

For analysis, the product was successively recrystallized from hot ethanol, cyclohexane and hexane to obtain a product melting at 82° C. The product was soluble in chloroform, ethanol, acetone, benzene and very slightly soluble in n-heptane.

*Analysis.*—Calculated for $C_{27}H_{32}O_6$; molecular weight=452.53 (percent): C, 71.65; H, 7.13. Found (percent): C, 71.5; H, 7.1.

U.V. spectrum (in ethanol):

Max. 236–237 m$\mu$ $E_{1\,cm.}^{1\%}$=518

Infl. 247–248 m$\mu$ $E_{1\,cm.}^{1\%}$=399

Infl. 278–279 m$\mu$ $E_{1\,cm.}^{1\%}$=31

Infl. 297–298 m$\mu$ $E_{1\,cm.}^{1\%}$=9

As far as is known, this compound is not described in the literature.

Step B: Preparation of 3-ethoxycarbonyl-17$\beta$-benzoyloxy-A-nor-$\Delta^{3(5),9}$-estradiene-2-one 125 gm. of 2,5-dioxo-3-ethoxycarbonyl-3,5-seco-17$\beta$-benzoyloxy-A-nor-estra-9-ene were introduced into 1250 cc. of anhydrous benzene and 7.7 gm. of potassium t.-butylate were added thereto and the mixture thus formed was agitated under an atmosphere of nitrogen for 2 hours. The medium was acidified by adding acetic acid and was poured into water. The solution was decanted, dried and evaporated to dryness. The residue was recrystallized from a mixture of ethanol and benzene (10:1) to provide 84 gm. (70% yield) of 3-ethoxycarbonyl-17$\beta$-benzoyloxy-A-nor-$\Delta^{3(5),9}$-estradiene-2 - one having a melting point of 214.5° C., which product was used as is for the next step.

For analysis, the product was recrystallized from ethanol to obtain a product melting at 217.5° C. and which was soluble in benzene and in hot ethanol and ethyl acetate.

*Analysis.*—Calculated $C_{27}H_{30}O_5$; molecular weight= 434.51 (percent): C, 74.63; H, 6.96. Found (percent): C, 74.8; H, 7.0.

U.V. spectrum (in ethanol):

$\lambda_{max.}$ 230 m$\mu$ $E_{1\,cm.}^{1\%}$=513

$\lambda_{max.}$ 311 m$\mu$ $E_{1\,cm.}^{1\%}$=588

As far as is known, this compound is not described in the literature.

Step C: Preparation of 3-carboxy-A-nor-$\Delta^{3(5),9}$-estradiene-17$\beta$-ol-2-one 84 gm. of 3 - ethoxycarbonyl - 17$\beta$ - benzoyloxy-A-nor - $\Delta^{3(5),9}$ - estradiene - 2 - one were dissolved in 1.75 liters of dioxane and 0.85 liter of water and 0.85 liter of hydrochloric acid (d.: 1.18) were added thereto. The mixture was agitated and heated to reflux which was maintained for 2 hours. The solution was cooled and crystallization was started by seeding with a few crystals of 3 - carboxy - 17$\beta$ - benzoyloxy - A - nor - $\Delta^{3(5),9}$-estradiene-2-one. Then water was added and the solution after standing for one hour at about 0° C. was filtered and dried to obtain 41.8 gm. of 3 - carboxy - 17$\beta$ - benzoyloxy - A - nor - $\Delta^{3(5),9}$ - estradiene - 2 - one having a melting point of 200° C. which was used as is for the next step.

The mother liquors and the wash waters were extracted with methylene chloride and the extract was washed with water, then with a solution of sodium bicarbonate, and by acidification of the alkaline phase, and extraction with methylene chloride 26.5 gm. of 3 - carboxy - A - nor-$\Delta^{3(5),9}$ - estradiene 17$\beta$ - ol - 2 - one having a melting point of first 160° C. and then 200° C. were obtained.

For analysis, the two products obtained above were purified in the following manner:

(a) 3-carboxy-17$\beta$-benzoyloxy-A-nor-$\Delta^{3(5),9}$-estradiene-2-one 300 mg. of the product melting at 195° to 200° C. were recrystallized from an ethanol/benzene mixture (2:1) which was ice cooled and filtered to obtain 146 mg. of the product melting at 216° C. which, after recrystallization a second time from the same mixture, gave 119 mg. of product melting at 218° C. and having a specific rotation $[\alpha]_D^{20}$=+81.5° (c.=0.5% in chloroform).

*Analysis.*—Calculated for $C_{25}H_{26}O_5$; molecular weight =406.45 (percent): C, 73.87; H, 6.45. Found (percent): C, 74.0; H, 6.8.

U.V. spectrum (in ethanol):

$\lambda_{max.}$ 230 m$\mu$ $E_{1\,cm.}^{1\%}$=529

$\lambda_{max.}$ 314 m$\mu$ $E_{1\,cm.}^{1\%}$=539

Circular dichroism (in dioxane):

$\Delta_\epsilon$ 353+1.87
$\Delta_\epsilon$ 316—2.57
$\Delta_\epsilon$ 280—2.52
$\Delta_\epsilon$ 233+13.10

N.M.R. spectrum (60 mHz.):

Me 18—66 Hz.
$H_{17}$ at about 290 Hz.

protons of the benzoate at about 446–483 Hz.

$CH_2$ at 1 at about 189 Hz.
COOH—706 Hz.

As far as is known, this compound is not described in the literature.

(b) 3-carboxy-A-nor-$\Delta^{3(5),9}$-estradiene-17$\beta$-ol-2-one 870 mg. of product melting at 160° and 200° C. were dissolved in acetone and the solution was heated to reflux, cooled to obtain 445 mg. of product melting at 161 and 204° C. Then a second recrystallization provided 235 mg. of product melting at 204° C. and having a specific rotation $[\alpha]_D^{20}$=—5.2° (c.=0.5% in chloroform). The product was soluble in acetone and ethanol.

*Analysis.*—Calculated for $C_{18}H_{22}O_4$; molecular weight =302.36 (percent): C, 71.49; H, 7.34. Found (percent): C, 71.2; H, 7.4.

U.V. spectrum (in ethanol):

$\lambda_{max.}$ 229 m$\mu$ $E_{1\,cm.}^{1\%}$=307

$\lambda_{max.}$ 317–318 m$\mu$ $E_{1\,cm.}^{1\%}$=683

Circular dichroism (in ethanol):

$\Delta_\epsilon$ 350+1.50
$\Delta_\epsilon$ 310—4.62
$\Delta_\epsilon$ 227+7.12

N.M.R. spectrum (60 mHz.)

Me 18—55.5 Hz.
$CH_2$ at 1 at about 190.0 Hz.
$H_{17}$—225.0 Hz.
COOH not visible.

As far as is known, this compound is not described in the literature.

Step D: Preparation of A-nor-$\Delta^{5(10),9(11)}$-estradiene-17$\beta$-ol-2-one (a) 6.62 gm. of 3 - carboxy - 17$\beta$ - benzoyloxy - A-nor - $\Delta^{3(5),9}$ - estradiene - 2 - one were dissolved in 44 cc. of anhydrous quinoline under an atmosphere of nitrogen and after 0.44 gm. of copper chromite were added thereto, the mixture was heated to about 130° to 135° C. This temperature was maintained for half an hour, after which the mixture was cooled and taken up in methylene chloride and water. The organic phase was decanted off and washed with N hydrochloric acid, then with water, dried and evaporated to dryness in vacuo. The residue was purified by passage over magnesium silicate and elution with methylene chloride. The product thus obtained was pasted in hot ethyl ether to provide 3.67 gm. (62% yield) of 17β - benzoyloxy - A - nor - Δ$^{5(10),9(11)}$-estradiene-2-one having a melting point of 173 to 176° C. The product was soluble in chloroform, ethanol and benzene and very slightly soluble in ethyl ether.

U.V. spectrum (in ethanol):

$\lambda_{max.}$ 234 m$\mu$ $E_{1\,cm.}^{1\%}$=782

$\lambda_{infl.}$ 250 m$\mu$ $E_{1\,cm.}^{1\%}$=385

$\lambda_{infl.}$ 272 m$\mu$ $E_{1\,cm.}^{1\%}$=73

$\lambda_{max.}$ 280 m$\mu$ $E_{1\,cm.}^{1\%}$=65

$\lambda_{infl.}$ 292 m$\mu$ $E_{1\,cm.}^{1\%}$=43

$\lambda_{infl.}$ 335 m$\mu$ $E_{1\,cm.}^{1\%}$=14

As far as is known, this compound is not described in the literature.

(b) 29.3 gm. of 3-carboxy-A-nor-Δ$^{3(5),9}$-estradiene-17β-ol-2-one were dissolved in 190 cc. of anhydrous quinoline and after adding 1.9 gm. of copper chromite thereto, the mixture thus formed was heated at 130–135° C. for half an hour under an atmosphere of nitrogen. The mixture was ice cooled and then water and methylene chloride were added. The organic phase was decanted off and washed with 2.5 N hydrochloric acid, then with water, dried and evaporated to dryness in vacuo. The residue was purified by passage over a column of magnesium silicate and elution with methylene chloride to obtain 17.3 gm. of product, having a melting point of 140° C., consisting essentially in crystalline A-nor-Δ$^{5(10),9(11)}$-estradiene-17β-ol-2-one.

U.V. spectrum (in ethanol):

$\lambda_{infl.\;at\;about}$ 227–228 m$\mu$ $E_{1\,cm.}^{1\%}$=503

$\lambda_{max.\;at}$ 236 m$\mu$ $E_{1\,cm.}^{1\%}$=580

$\lambda_{max.\;at}$ 242 m$\mu$ $E_{1\,cm.}^{1\%}$=601

$\lambda_{infl.\;at\;about}$ 250 m$\mu$ $E_{1\,cm.}^{1\%}$=424

$\lambda_{max.\;at}$ 286–287 m$\mu$ $E_{1\,cm.}^{1\%}$=92

$\lambda_{infl.\;at\;about}$ 311 m$\mu$ $E_{1\,cm.}^{1\%}$=44

As far as is known, this compound is not described in the literature.

Step E: Preparation of A-nor-Δ$^{3(5),9,11}$-estratriene-17β-ol-2-one (a) 125 mg. of 17β-benzoyloxy-A-nor-Δ$^{5(10),9(11)}$-estradiene were introduced into 2.5 cc. of dioxane and after adding 132 mg. of 2,3-dichloro-5,6-dicyano-p-benzoquinone thereto, the mixture thus formed was agitated under an atmosphere of nitrogen at ambient temperature for 6 hours. The mixture was filtered and 5 cc. of benzene were added to the filtrate. The solution was washed with an aqueous solution of sodium bicarbonate containing a small quantity of sodium hyposulfite, then with water, dried and evaporated to dryness in vacuo. The residue was purified by chromatography on silica to obtain 35 mg. (28% yield) of 17β-benzoyloxy-A-nor-Δ$^{3(5),9,(11)}$-estratriene-2-one having a melting point of 135° C. The product appeared in the form of yellow crystals, soluble in ethanol and chloroform and insoluble in petroleum ether.

U.V. spectrum (in ethanol):

$\lambda_{max.}$ 232 m$\mu$ $E_{1\,cm.}^{1\%}$=520

$\lambda_{max.}$ 262 m$\mu$ $E_{1\,cm.}^{1\%}$=158

$\lambda_{max.}$ 274 m$\mu$ $E_{1\,cm.}^{1\%}$=177

$\lambda_{infl.}$ 283 m$\mu$ $E_{1\,cm.}^{1\%}$=195

$\lambda_{max.}$ 329 m$\mu$ $E_{1\,cm.}^{1\%}$=696

The product is identical with a sample resulting from another synthesis.

(b) 8 gm. of the product obtained in step D(b) were dissolved in 80 cc. of anhydrous dioxane and after 7 gm. of 2,3 - dichloro - 5,6 - dicyano - p - benzoquinone were added thereto, the reaction mixture was agitated under an atmosphere of nitrogen at a temperature of 10° to 12° C. for 3¾ hours. The mixture was filtered and 400 cc. of benzene were added to the filtrate. The solution was washed with a saturated solution of sodium bicarbonate containing a small quantity of sodium hyposulfite, then with water, dried and evaporated to dryness in vacuo to obtain 6.4 gm. of A-nor-Δ$^{3(5),9,11}$-estratriene-17β-ole-2-one.

The product is identical with a sample resulting from another synthesis.

EXAMPLE II

Preparation of 17β-benzoyloxy-A-nor-Δ$^{5(10),9(11)}$-estradiene-2-one 84 gm. of 3-ethoxycarbonyl-17β-benzoyloxy-A-nor-Δ$^{3(5),9}$-estradiene-2-one were dissolved in 1.75 liters of dioxane and after adding thereto 0.85 liter of water and 0.85 liter of hydrochloric acid (d: 1.18), the mixture was agitated and heated to reflux. After refluxing for 2 hours, the mixture was cooled and diluted with water. The solution was extracted with methylene chloride and the extracts were washed with water, then with an aqueous solution of sodium bicarbonate. The alkaline phase was acidified by adding dilute acetic acid and extracted with methylene chloride, washed with water, dried and evaporated to dryness in vacuo. The residue consisted of a mixture of 3-carboxy-A-nor-Δ$^{3(5),9}$ estradiene-17β-ol-2-one and the corresponding 17β-benzoate.

Decarboxylation was effected in an analogous manner to that described in Example I, Step D, to provide 65 gm. of a mixture of A-nor-Δ$^{5(10),9(11)}$-estradiene-17β-ol-2-one and of the corresponding 17β-benzoate.

This product was dissolved in 300 cc. of anhydrous benzene under an atmosphere of nitrogen and after adding 100 cc. of pyridine thereto, the mixture was cooled to 0° C. and 65 cc. of benzoyl chloride were added. The reaction mixture was agitated with cooling for 5 hours and then water was added and the mixture was agitated for 2 hours. The organic phase was then decanted and washed with dilute hydrochloric acid, with water, with an aqueous solution of sodium bicarbonate and with water, dried and evaporated to dryness in vacuo. The residue was crystallized from ether to provide 45 gm. of 17β - benzoyloxy - A - nor - Δ$^{5(10),9(11)}$ - estradiene - 2-one identical with the product described above.

EXAMPLE III

Preparation of 17β-acetoxy-A-nor-Δ$^{3(5),9,11}$-estratriene-2-one 8.1 gm. of crude A-nor-Δ$^{3(5),9,11}$-estratriene-17β-ol-2-one, obtained as described in Example I, were introduced into 80 cc. of anhydrous pyridine and after adding 32 cc. of acetic anhydride thereto, the mixture was agitated for 3 hours 45 minutes at ambient temperature. The mixture was then poured over a mixture of water and ice and extracted with methylene chloride. The extracts were washed with 2.5 N hydrochloric acid, then with water, dried and evaporated to dryness in vacuo. The residue was purified by chromatography on silica gel in benzene/ethyl acetate mixture (7:3) to obtain 2.1 gm. of 17β-acetoxy-A-nor-Δ$^{3(5),9,11}$-estratriene-2-one having a melting point of 149° to 150° C., identical with a sample of a product resulting from a different synthesis.

EXAMPLE IV.—Preparation of 17β-methallyloxy-A-nor-Δ$^{3(5),9,11}$-estratriene-2-one Step A: Preparation of 2-ethylenedioxy-A-nor-Δ$^{5(10),9(11)}$-estradiene-17β-ol 6.1 gm. of A-nor-Δ$^{5(10),9(11)}$-estradiene-17β-ol-2-one were introduced into 305 cc. of chloroform and after adding 30.5 cc. of ethyleneglycol and 1.22 gm. of pyridine hydrochloride thereto, the mixture was heated at reflux for 7 hours with regular addition of 1.20 gm. of pyridine hydrochloride four times during this heating. After cooling, the mixture was poured into a saturated solution of sodium bicarbonate and extracted with methylene chloride. The extracts were washed with water, dried and evaporated to dryness in vacuo. The residue was chromatographed on silica gel to provide 2.17 gm. (30% yield) of 2-ethylenedioxy-A-nor-$\Delta^{5(10),9(11)}$-estradiene-17β-ol having a melting point of 166° C. and a specific rotation $[\alpha]_D^{20} = +173°$ (c=0.5% in chloroform).

Analysis.—Calculated for $C_{19}H_{26}O_3$; molecular weight= 302.40 (percent): C, 75.46; H, 8.67. Found (percent): C, 75.6; H, 8.8.

U.V. spectrum (in ethanol):

$$\lambda_{max.}\ 228\ m\mu\ E^{1\%}_{1\ cm.} = 487$$

$$\lambda_{max.}\ 235\ m\mu\ E^{1\%}_{1\ cm.} = 668$$

$$\lambda_{max.}\ 243\ m\mu\ E^{1\%}_{1\ cm.} = 731$$

$$\lambda_{max.}\ 251\text{-}252\ m\mu\ E^{1\%}_{1\ cm.} = 475$$

As far as is known, this compound is not described in the literature.

Step B: Preparation of 2-ethylenedioxy-17β-methallyloxy-A-nor-$\Delta^{5(10),9(11)}$-estradiene 3 gm. of 2-ethylenedioxy-A-nor-$\Delta^{5(10),9(11)}$-estradiene-17β-ol were introduced into 30 cc. of anhydrous tetrahydrofuran and after adding 1.2 gm. of 50% sodium hydride in paraffin oil thereto, the suspension thus formed was heated to reflux for 30 minutes under an atmosphere of nitrogen. Then 10 cc. of methallyl chloride were added thereto and the heating at reflux was maintained for 5 hours. After cooling, the mixture was poured into water saturated with sodium bicarbonate and extracted with methylene chloride. The extracts were washed with water, dried and evaporated to dryness in vacuo. The residue was chromatographed on silica gel and eluted with an ether/petroleum ether (B.P. 65–75° C.) mixture (1:1) to obtain 2.8 gm. (79% yield) of 2-ethylenedioxy-17β-methallyloxy-A-nor-$\Delta^{5(10),9(11)}$-estradiene. This was a pale yellow product melting at about 50° C. and which was soluble in chloroform. The infrared spectrum in chloroform confirms the absence of the hydroxyl group and the presence or bands 1,654 cm.$^{-1}$ and 904 cm.$^{-1}$ attributable to the allyl group. It was used without further purification for the next step.

As far as is known, this compound is not described in the literature.

Step C: Preparation of 17β-methallyloxy-A-nor-$\Delta^{5(10),9(11)}$-estradiene-2-one 2.8 gm. of 2-ethylenedioxy-17β-methallyloxy-A-nor-$\Delta^{5(10),9(11)}$-estradiene were introduced into 120 cc. of acetic acid containing 25% water and the mixture was agitated at ambient temperature for 6 hours. The mixture was poured into water and extracted with methylene chloride. The extracts were washed with a saturated aqueous solution of sodium bicarbonate, then with water, dried and evaporated to dryness in vacuo to obtain 2.46 gm. of 17β-methallyloxy-A-nor-$\Delta^{5(10),9(11)}$-estradiene-2-one which was used as is for the next step. This was a solid, amorphous product which was soluble in chloroform.

I. R. spectrum:

Ketone at 1747 cm.$^{-1}$
C=CH$_2$ grouping 1654 cm.$^{-1}$ 904 cm.$^{-1}$

As far as is known, this compound is not described in the literature.

U.V. spectrum (in ethanol):

$$\lambda_{max.}\ 239\text{-}240\ m\mu\ E^{1\%}_{1\ cm.} = 244$$

$$\lambda_{infl.}\ 246\ m\mu\ E^{1\%}_{1\ cm.} = 225$$

$$\lambda_{max.}\ 262\ m\mu\ E^{1\%}_{1\ cm.} = 159$$

$$\lambda_{max.}\ 275\ m\mu\ E^{1\%}_{1\ cm.} = 174$$

$$\lambda_{max.}\ 331\text{-}332\ m\mu\ E^{1\%}_{1\ cm.} = 872$$

Circular dichroism (in ethanol);

$\Delta_e$ 357 m$\mu$+2.90
$\Delta_e$ 312 m$\mu$−6.16
$\Delta_e$ 280 m$\mu$−2.53
$\Delta_e$ 225 m$\mu$+3.09

N.M.R. spectrum ($\gamma_0$=60 mHz.)

—Me 18    61.5 Hz

—CH$_3$—$\overset{|}{C}$=    108–109. Hz

—CH$_2$ at 1    180.5 Hz

—OCH$_2$—$\overset{|}{C}$=    234.5 Hz $\underset{/}{\overset{\backslash}{C}}$=CH$_2$    296–302 Hz H$_3$    358.5 Hz H$_{11}$H$_{12}$    362–372–386.3–396 Hz As far as is known, this compound is not described in the literature.

Step D: Preparation of 17β-methallyloxy-A-nor-$\Delta^{3,(5),9,11}$-estratriene-2-one 2.4 gm. of 17β-methallyloxy-A-nor-$\Delta^{5(10),9(11)}$-estradiene-2-one were introduced into 24 cc. of dioxane and after adding 2.1 gm. of 2,3-dichloro-5,6-dcyano-p-benzoquinone thereto, the mixture was agitated under an atmosphere of nitrogen at a temperature of +10° to +12° C. for 5 hours. The mixture was then filtered and the insoluble part was washed with benzene. The benzene solutions were combined with the filtrate and washed with a saturated aqueous solution of sodium bicarbonate containing a small quantity of sodium hydrosulfite, then with water, dried and evaporated to dryness in vacuo. The residue was purified by chromatography on silica gel and elution with ether containing 33% petroleum ether. The product thus obtained was dissolved in methylene chloride and passed over a column of magnesium silicate to obtain after recrystallization from isopropyl ether 656 mg. (27% yield) of 17β-methallyloxy-A-nor-$\Delta^{3(5),9,11}$-estratriene-2-one having a melting point of 86° C. and a specific rotation $[\alpha]_D^{20} = -66.6°$ (chloroform). The product appeared in the form of yellow crystals soluble in chloroform and ethanol.

Analysis.—Calculated for $C_{21}H_{26}O_2$; molecular weight =310.42 (percent): C, 81.24; H, 8.44. Found (percent): C, 81.1; H, 8.7.

EXAMPLE V.—Preparation of 2-ethylenedioxy-A-nor-$\Delta^{5(10),9,(11)}$-estradiene-17β-ol Step A: Preparation of 2-ethylenedioxy-17β-benzoyloxy-A-nor-$\Delta^{5,(10),9(11)}$-estradiene 396 mg. of 17β-benzoyloxy-A-nor-$\Delta^{5(10),9(11)}$-estradiene-2-one were dissolved in 20 cc. of chloroform and after adding 2 cc. of ethyleneglycol and 40 mg. of anhydrous pyridine hydrochloride thereto, the mixture was heated at reflux with agitation under an atmosphere of nitrogen while distilling off the solvent. After the 2nd, 4th and 6th hours, 40 mg. of pyridine hydrochloride were added and then the heating under agitation was continued for 18 and ½ hours. After cooling, the mixture was poured into a saturated aqueous solution of sodium bicarbonate and the organic phase was decanted off and washed with water, dried and evaporated to dryness in vacuo. The residue was dissolved in methylene chloride and purified by passage over a column of magnesium silica to obtain after recrystallization from ethyl ether 300 mg. (67% yield) of 2-ethylenedioxy - 17β - benzoyloxy-A-nor-$\Delta^{5(10),9(11)}$-estradiene having a melting point of 142° C. The product occurred in the form of colorless crystals soluble in chloroform and ethanol.

As far as is known, this compound is not described in the literature.

Step B: Preparation of 2-ethylenedioxy-A-nor-
Δ$^{5(10),9(11)}$-estradiene-17β-ol 5.2 gm. of 2 - ethylendioxy - 17β - benzoyloxy-A - nor - Δ$^{5(10),9(11)}$ - estradiene were introduced into 104 cc. of methanol and 5.2 cc. of potassium hydroxide were added thereto. The suspension thus formed was heated at reflux for 30 minutes, then cooled and poured into water and extracted with ethyl acetate. The extracts were washed with water, dried and evaporated to dryness in vacuo. The residue was dissolved in methylene chloride and was passed over a column of magnesium silicate to obtain 3.6 gm. (93% yield) of 2 - ethylenedioxy-A-nor-Δ$^{5(10)9,(11)}$-estradiene-17β-ol with a melting point of 164° C.

For analysis, the product was recrystallized from isopropyl ether (recrystallization yield=65%) to obtain a sample melting at 166° C., which was identical with the product of Example IV.

PHARMACOLOGICAL DATA

Anabolisant and androgenic activity

The anabolisant and androgenic activity of 17β-methallyloxy-A-nor-Δ$^{3(5),9,11}$-estratriene-2-one was determined according to the slightly modified technique of Hershberger [Proc. Soc. Exp. Biol. Med., 1953, 83, 175]. The test was conducted on castrated male rats 3½ weeks old. Beginning on the day after castration, the rats received the test compounds for 10 days daily with the exception of the 6th day. They were sacrificed on the 11th day, 22 to 26 hours after the last administration. An autopsy was conducted on each animal, and the levator ani for the study of the anabolistant action, and the prostate gland and seminal vesicles for the study of the androgenic effect, were removed and weighed.

17β-methallyloxy - A - nor-Δ$^{3(5),9,11}$-estratriene-2-one in a solution of olive oil admixed with 5% benzyl alcohol was administered subcutaneously at daily doses of $$\frac{10\gamma \times 10}{9} \text{ and } \frac{100\lambda \times 10}{9}$$

total dose of 100γ and 1 mg. divided into nine administrations over 10 days). The results obtained are summarized in the following table and are presented by way of comparison with the results obtained with 19-nor-testosterone acetate administered in the same experimental conditions and at doses of $$\frac{20\gamma \times 10}{9} \text{ and } \frac{100\gamma \times 10}{9}$$

TABLE I

| | Daily dose | Fresh Levator ani, mg. | Seminal vesicles, mg. | Prostate gland, mg. |
|---|---|---|---|---|
| | Controls | | | |
| | 0 | 20.1 | 5.5 | 10.1 |
| 17β-methalyloxy-A-nor-Δ$^{3(5),9,11}$-estratriene-2-one | $\frac{10\gamma \times 10}{9}$ | 32.2 | 19.4 | 35.6 |
| | $\frac{100\gamma \times 10}{9}$ | 49.2 | 111.6 | 99.9 |
| | Controls | | | |
| | 0 | 21.4 | 7.6 | 10.3 |
| 19-nor-testosterone acetate | $\frac{20\gamma \times 10}{9}$ | 35.7 | 9.2 | 15.5 |
| | $\frac{100\gamma \times 10}{9}$ | 51.3 | 27.1 | 34.3 |

These results show that 17β - methallyloxy - A - nor-Δ$^{3(5),9,11}$-estratriene-2-one, when administered subcutaneously possesses an anbolisant activity equal to that of 19-nor-testosterone acetate and a superior androgenic activity.

17β-methallyloxy-A-nor-Δ$^{3(5),9,11}$-estratriene-é-one was also studied according to a closely related technique to the Hershberger test. The said compound proved to be active at a dose of $$\frac{100\gamma \times 10}{9}$$

when given orally.

Various modifications of the compositions and methods of the invention may be made without departing from the spirit or scope thereof and it is to be understood that the invention is to be limited only as defined in the appended claims.

We claim:
1. A process for the preparation of an A-nor compound of the formula

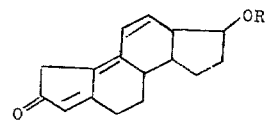

wherein R is selected from the group consisting of hydrogen, acyl of an organic carboxylic acid of 1 to 18 carbon atoms, tetrahydropyranyl, alkoxymethylene and alkylthiomethylene of 2 to 10 carbon atoms, lower alkenyl and aralkoxymethylene and alkylthiomethylene of 2 to 10 carbon atoms, lower alkenyl and aralkoxymethylene and aralkylthiomethylene of 7 to 10 carbon atoms which comprises condensing in the presence of an alkali metal iodide an enamine of the formula

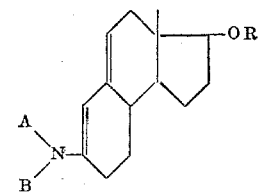

wherein A is selected from the group consisting of lower alkyl, lower alkenyl and phenyl lower alkyl, B is lower alkyl and A and B taken together may be selected from the group consisting of lower alkylene and ethylene oxyethylene with a lower alkyl of γ-halo-β-lower alkoxycrotonate in an aprotic solvent to form a compound of the formula

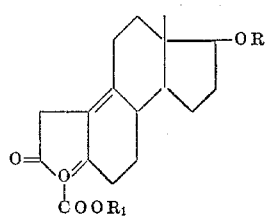

wherein R$_1$ is lower alkyl, cyclizing the latter with an alkaline agent to form a compound of the formula

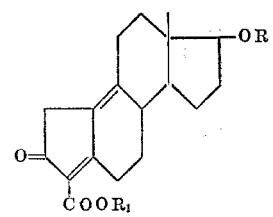

subjecting the latter to acid hydrolysis to form the corresponding 3-carboxyl compound, decarboxylating the latter by heating to form 17β-OR-A-nor-Δ$^{5(10),9(11)}$-estradiene-2-one and reacting the latter with a p-benzoquinone selected from the group consisting of 2,3-dichloro-5,6-dicyano-p-benzoquinone, 2,3-dibromo-5,6-dicyano-p-benzoquinone, 2,3,5,6-tetrachloro-p-benzoquinone, 2,3-dicyano-5-chloro-p-benzoquinone and 2,3-dicyano-p-benzoquinone to form 17β-OR-A-nor-Δ$^{3(5),9,11}$-estratriene-2-one.

2. The process of claim 1 wherein the lower alkyl γ-halo-β-alkoxycrotonate is ethyl γ-bromo-β-ethoxycrotonate and the condensation is effected in the presence of potassium iodide in di-lower-alky formamide.

3. The process of claim 1 wherein the cyclization is effected with an alkali metal alcoholate in an organic solvent at about room temperature.

4. The process of claim 1 wherein the acid hydrolysis is effected with a strong mineral acid in an aqueous organic solvent.

5. The process of claim 1 wherein the decarboxylation is effected by heating in a high boiling organic solvent in the presence of copper chromite.

6. The process of claim 1 wherein the p-benzoquinone is 2,3-dichloro-5,6-dicyano-p-benzoquinone.

7. A process for the preparation of 17β-lower alkenyloxy-A-nor-Δ$^{3(5),9,11}$-estratriene-2-one which comprises condensing in the presence of an alkali metal iodide an enamine of the formula

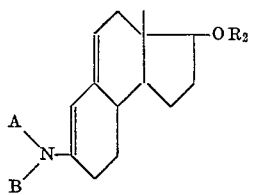

wherein R$_2$ is selected from the group consisting of hydrogen and acyl of an organic carboxylic acid of 1 to 18 carbon atoms, A is selected from the group consisting of lower alkyl, lower alkenyl and phenyl lower alkyl, B is lower alkyl and A and B taken together may be selected from the group consisting of lower alkylene and ethyleneoxyethylene with a lower alkyl γ-halo-β-lower alkoxycrotonate in an aprotic solvent to form a compound of the formula

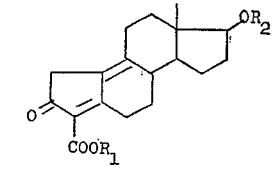

wherein R$_1$ is lower alkyl, cyclizing the latter with an alkaline agent to form a compound of the formula subjecting the latter to acid hydrolysis to form the corresponding 3-carboxyl compound, decarboxylating the latter by heating to form 17β-OR$_2$-A-nor-Δ$^{5(10),9(11)}$-estradiene-2-one, protecting the ketone in the 2-position in the form of ethylene dioxy, and reacting the compound thus obtained with an alkenyl halide, after saponification under alkaline conditions when R$_2$ is acyl, to form the corresponding 17β-alkenyloxy derivative, subjecting the latter to acid hydrolysis, and reacting the 17β-alkenyloxy-2-one compound thus obtained with a p-benzoquinone selected from the group consisting of 2,3-dichloro-5,6-dicyano-p-benzoquinone, 2,3-dibromo-5,6-dicyano-p-benzoquinone, 2,3,5,6-tetrachloro-p-benzoquinone, 2,3-dicyano-5-chloro-p-benzoquinone and 2,3-dicyano-p-benzoquinone to form the corresponding 17β-alkenyloxy-A-nor-Δ$^{3(5),9,11}$-estratriene-2-one.

References Cited
UNITED STATES PATENTS 3,085,098   4/1963   Nomine et al. _____ 260—586 X
3,150,152   9/1964   Joly et al. _____ 260—586 X
3,155,660   11/1964  Nomine et al. _____ 260—586 X ALEX MAZEL, Primary Examiner J. H. TURNIPSEED, Assistant Examiner U.S. Cl. X.R.

260—247.2, 294.3, 326.8, 345.9, 347.5, 398, 468, 471, 473, 476, 488, 586; 424—278